(12) United States Patent
Ukai et al.

(10) Patent No.: US 7,763,388 B2
(45) Date of Patent: Jul. 27, 2010

(54) FUEL CELL SYSTEM

(75) Inventors: Kunihiro Ukai, Nara (JP); Yumi Kondo, Osaka (JP)

(73) Assignee: Panasonic Corporation, Osaka (JP)

( * ) Notice: Subject to any disclaimer, the term of this patent is extended or adjusted under 35 U.S.C. 154(b) by 1035 days.

(21) Appl. No.: 10/587,164

(22) PCT Filed: Jan. 28, 2005

(86) PCT No.: PCT/JP2005/001250

§ 371 (c)(1),
(2), (4) Date: Jul. 26, 2006

(87) PCT Pub. No.: WO2005/074064

PCT Pub. Date: Aug. 11, 2005

(65) Prior Publication Data

US 2007/0160881 A1      Jul. 12, 2007

(30) Foreign Application Priority Data

Jan. 30, 2004    (JP) .............................. 2004-022882

(51) Int. Cl.
*H01M 8/04* (2006.01)
(52) U.S. Cl. ................... 429/428; 429/434; 429/442
(58) Field of Classification Search ............... 429/22, 429/26, 24
See application file for complete search history.

(56) References Cited

U.S. PATENT DOCUMENTS

| 6,841,281 B2 | 1/2005 | Itou et al. | |
| 2003/0129465 A1* | 7/2003 | Nakamura et al. | 429/26 |

FOREIGN PATENT DOCUMENTS

| JP | 08022833 | 1/1996 |
| JP | 08138714 | 5/1996 |
| JP | 09063611 | 3/1997 |
| JP | 09063612 | 3/1997 |
| JP | 09306523 | 11/1997 |
| JP | 09306524 | 11/1997 |
| JP | 2000348752 | 12/2000 |
| JP | 2001176535 | 6/2001 |

(Continued)

OTHER PUBLICATIONS

PCT International Search Report dated May 24, 2005.

*Primary Examiner*—Patrick Ryan
*Assistant Examiner*—Thomas H. Parsons
(74) *Attorney, Agent, or Firm*—Dickinson Wright PLLC (57) ABSTRACT

A fuel cell system includes a hydrogen generator that generates hydrogen by a reforming reaction using a material and water. A fuel cell generates power by electrochemical reaction using the hydrogen and an oxidizing agent. A cooling water circulation portion circulates water for cooling the fuel cell. A water condenser condenses water discharged from the hydrogen generator or the fuel cell and the condensed water is stored in a water storage portion. A water supply portion moves the water from the water storage portion to the hydrogen generator, the fuel cell, or the cooling water circulation portion. A water replenishment portion replenishes water in the water storage portion from the cooling water circulation portion. A controller discards the water from the water storage portion through a discharge port and the water replenishment portion causes the cooling water circulation portion to replenish the water storage portion.

8 Claims, 4 Drawing Sheets

FOREIGN PATENT DOCUMENTS

| | | |
|---|---|---|
| JP | 2002270194 | 9/2002 |
| JP | 2002270211 | 9/2002 |
| JP | 2002343393 | 11/2002 |
| JP | 2004103394 | 4/2004 |
| JP | 2005108561 | 4/2005 |

* cited by examiner

| OPERATION TIME[h] | 0 | 1 | 5 | 10 | 20 |
|---|---|---|---|---|---|
| RELATIVE VALUE OF BACTERIA[-] | 1 | 0.9 | 0.6 | 0.35 | 0.12 |

Fig. 4(a)

| OPERATION TIME[day] | 1 | 2 | 3 | 4 | 5 | 6 |
|---|---|---|---|---|---|---|
| RELATIVE VALUE OF BACTERIA[-] | 1 | 0.5 | 0.3 | 0.2 | 0.15 | 0.1 |

Fig. 4(b)

FUEL CELL SYSTEM

TECHNICAL FIELD

The present invention relates to a fuel cell system configured to generate power using an organic compound containing at least carbon and hydrogen, and water. More particularly, the present invention relates to a fuel cell system capable of effectively suppressing progress of decay of the water.

BACKGROUND ART

Since a fuel cell system capable of high-efficient and small-scale power generation is conventionally easily configured to use heat energy generated during power generation, it has been developed as a distributed power generation system that is able to achieve high energy utilization efficiency.

The fuel cell system includes a fuel cell which is a power generation portion. In this fuel cell, hydrogen (hydrogen gas) is typically used as a fuel for power generation. However, at present, a hydrogen supply means required to generate power in the fuel cell is not equipped as infrastructure. So, a conventional fuel cell system is equipped with a hydrogen generator configured to generate hydrogen necessary for power generation. In the hydrogen generator, a fossil fuel such as a natural gas is reformed through a predetermined reforming reaction to generate hydrogen. In the conventional fuel cell system, hydrogen generated in the hydrogen generator is supplied to the fuel cell as a fuel for power generation. In the fuel cell, power generation is carried out to output predetermined power using the hydrogen supplied from the hydrogen generator.

In the reforming reaction to generate hydrogen in the hydrogen generator, a steam reforming reaction is typically used. In the steam reforming reaction, the fossil fuel is reformed using the steam to generate hydrogen. So, the water is supplied to the hydrogen generator to generate steam during the power generation operation of the fuel cell system. In order to obtain predetermined power using the fuel cell system, it is essential that a water supply source be obtained in a place where the fuel cell system is installed.

As the water supply means to supply the water to the fuel cell system, a water line is suitably used. When the water line is used as the water supply means, it is necessary to fully remove calcium, chlorine, and so on, from the water supplied from the water line. This is because, if water containing calcium, chlorine, and so on, is supplied to the fuel cell system, performance of the fuel cell system degrades with time due to deposition of calcium or corrosion or the like of a pipe caused by chlorine. So, the conventional fuel cell system is equipped with a water purifier including an ion exchange resin or the like to fully remove calcium, chlorine, and so on, from the water supplied from the water line.

The water purifier including the ion exchange resin or the like is able to fully remove calcium, chlorine, and so on, contained in the water, but a purification ability of the ion exchange resin or the like degrades with time. So, the water purifier including the ion exchange resin or the like must be maintained frequently. This may increase a running cost of the fuel cell system. For this reason, in the conventional fuel cell system, the water is self-supplied in such a manner that water or the like generated by power generation in the fuel cell is obtained by condensation and utilized. In accordance with this water self-supply configuration, a running cost of the fuel cell system can be improved, because the water purifier may be omitted, or a load on the water purifier decreases and thus the frequency of maintenance therefor decreases.

However, the water obtained by condensation in the interior of the fuel cell system does not contain a sterilization component such as chlorine but contains microbes or bacteria, or nutrients, for example, organic matter, necessary for the microbes or the bacteria. For this reason, the water is more likely to decay with time. If decay of the water progresses, then failures such as passage clogging or passage narrowing occurs in a water condenser for condensing the water or in the interior of components such as pipes through which the water is supplied, causing a problem to occur in water supply function.

Accordingly, there have been proposed various means for suppressing progress of decay of water obtained by condensation in the interior of the fuel cell system.

For example, as a means for suppressing progress of decay of water in the interior of the fuel cell system, the components such as the pipes associated with water supply or water condensation, etc, is formed of an antibacterial metal material (see for example, patent document 1).

Also, as a means for suppressing progress of decay of water in the interior of the fuel cell system, an ultraviolet ray is emitted to the water obtained by condensation in the interior of the fuel cell system to kill bacteria, and so on, contained in the water (see for example, patent document 2).

Also, as a means for suppressing progress of decay of water in the interior of the fuel cell system, water flowing in the fuel cell system is controlled to have strong acidity so that the bacteria or the like contained in the water is killed (see for example, patent document 3).

Also, as a means for suppressing progress of decay of water in the interior of the fuel cell system, an antibacterial sterilization filter is provided in a water passage to eliminate bacteria or the like contained in the water (see for example, patent document 4).

Also, as a means for suppressing progress of decay of water in the interior of the fuel cell system, it is detected whether or not water flowing in the interior of the fuel cell system contains microbes, and the ultraviolet ray is emitted to the water if it is detected that the water contains the microbes, to thereby kill the bacteria or the like contained in the water (see for example, patent document 5).

Also, as a means for suppressing progress of decay of water in the interior of the fuel cell system, the temperature of the water flowing in the interior of the fuel cell system is increased up to a predetermined temperature necessary for heating and sterilization (see for example, patent document 6). In this case, to increase the temperature of the water up to the predetermined temperature for heating and sterilization, heat of cooling water that has been increased in temperature and has been discharged from a fuel cell is utilized to reduce an energy necessary to heat the water (see for example, patent document 7).

Patent document 1: Japanese Laid-Open Patent Application Publication No. Hei. 8-22833

Patent document 2: Japanese Laid-Open Patent Application Publication No. Hei. 9-63612

Patent document 3: Japanese Laid-Open Patent Application Publication No. Hei. 9-306523

Patent document 4: Japanese Laid-Open Patent Application Publication No. Hei. 8-63611

Patent document 5: Japanese Laid-Open Patent Application Publication No. 2002-270211

Patent document 6: Japanese Laid-Open Patent Application Publication No. Hei. 8-138714

Patent document 7: Japanese Laid-Open Patent Application Publication No. 2002-270194

DISCLOSURE OF THE INVENTION

Problems to be Solved by the Invention

However, among the above mentioned proposed means, in the means in which the components such as the pipes associated with water supply or water condensation, etc, is formed of the antibacterial metal material, progress of decay of the condensed water is more likely to be suppressed because a bacteria-elimination effect produced by an antibacterial action continues for a long time period, but elution of the antibacterial component from the metal material is unable to be controlled. As a consequence, a correct bacteria-elimination effect is sometimes unable to be achieved depending on a use condition. When the anti-bacterial component elutes from the metal material into the condensed water, a load on the ion exchange resin increases because of the eluting antibacterial component. In addition, in this means of utilizing the anti-bacterial effect, sufficient bacteria-elimination effect is unable to be gained depending on the type of bacteria contained in the water.

In the means in which the ultraviolet ray is emitted to the water obtained by condensation in the interior of the fuel cell system to inhibit progress of decay of water, in the means in which the water flowing in the fuel cell system is controlled to have strong acidity to inhibit progress of decay of water, or in the means in which the antibacterial sterilization filter eliminates the bacteria or the like contained in the water to inhibit progress of decay of water, it is possible to suppress progress of decay of water to some extent when a sterilization process or a bacteria elimination process is able to be carried out continuously. But, in these means, since it is difficult to fully decompose or remove organic matter contained in the water, the microbes or the bacteria grow because of the remaining organic matter, causing progress of decay of the water. For example, when a power generation operation of the fuel cell system stops for a long time period, the sterilization process or the bacteria elimination process is unable to be carried out, and therefore, decay of the condensed water is more likely to progress.

In the means in which the temperature of the water flowing in the interior of the fuel cell system is increased up to a predetermined temperature necessary for heating and sterilization to inhibit progress of decay of water, progress of decay of water is able to be effectively suppressed with a relatively simple configuration, but energy consumption increases because it is necessary to increase the temperature of the water up to the predetermined temperature for heating and sterilization. For example, when an electric heater or the like is used to heat the water up to a predetermined temperature, a large quantity of electric energy is consumed to cause the electric heater or the like to generate heat. In this case, if the heat energy of the temperature-increased cooling water that is discharged from the fuel cell is used, then it is possible to increase the temperature of the water up to the predetermined temperature necessary for heating and sterilization, and thus secondary energy consumption is omitted. But, when the temperature-increased cooling water is always used, most of the heat energy generated by power generation is consumed to heat the water, and therefore, heat energy that can be consumed for purposes of hot-water supply decreases.

Furthermore, in the means in which the temperature of the water is increased up to the predetermined temperature necessary for heating and sterilization, when the water flowing in the interior of the fuel cell system is always heated, the ion exchange resin or the like in some cases thermally degrades because of the water flowing in the system, which has been heated to have a high temperature.

The present invention has been developed to solve the above described problems, and an object of the present invention is to provide a fuel cell system that is capable of effectively suppressing progress of decay of water with a simple configuration and without wasting energy so as not to substantially cause problems to occur in water supply and water purification functions.

Means for Solving the Problem

The present invention has been made under the above mentioned circumstances, and a fuel cell system of the present invention comprises a hydrogen generator configured to generate hydrogen by causing a reforming reaction to proceed using a material and water; a fuel cell configured to generate power by causing an electrochemical reaction to proceed using the hydrogen generated in the hydrogen generator and an oxidizing agent; a cooling water circulation portion configured to circulate water for cooling the fuel cell; a water condenser configured to condense water discharged from at least one of the hydrogen generator and the fuel cell; a first water storage portion configured to store the water condensed by the water condenser; a water supply portion configured to take out the water from the first water storage portion and to supply the water to at least one of the hydrogen generator, the fuel cell, and the cooling water circulation portion; a controller; and a water replenishment portion configured to replenish the water in the first water storage portion from the cooling water circulation portion; wherein the first water storage portion is provided with a discharge port; and the controller is configured to perform control so that the water in the first water storage portion is discarded through the discharge port and the water replenishment portion causes the cooling water circulation portion to replenish the water in the first water storage portion (claim 1).

In such a configuration, since the water in the first water storage portion is discarded through the discharge port, and the water replenishment portion causes the cooling water circulation portion to replenish water in the first water storage portion, decay of the water in the first water storage portion is able to be suppressed.

In this case, the controller is configured to perform control so that at least a part of the water in the first water storage portion is discarded through the discharge port, and the water replenishment portion causes the cooling water circulation portion to replenish, in the first water storage portion, water equal in amount to the at least a part of the water (claim 2).

In such a configuration, since at least a part of water in the first water storage portion is discarded through the discharge port and the water replenishment portion causes the cooling water circulation portion to replenish, in the first water storage portion, the water equal in amount to the at least a part of the water, the fuel cell system is able to carry out the power generation operation stably.

In the above case, the controller is configured to perform control such that the water in the first water storage portion is discarded through the discharge port, and the water replenishment portion causes the cooling water circulation portion to replenish the water in the first water storage portion, at a time in a stop state of a power generation operation of the fuel cell (claim 3).

In such a configuration, since the water in the first water storage portion is discarded through the discharge port, and the water replenishment portion causes the cooling water circulation portion to replenish the water in the first water storage portion, at a time in the stop state of the power generation operation of the fuel cell, negative effect on the power generation operation of the fuel cell system can be avoided.

In this case, the controller is configured to perform control such that the water in the first water storage portion is discarded through the discharge port just after stop of the power generation operation of the fuel cell and the water replenishment portion causes the cooling water circulation portion to replenish the water in the first water storage portion water, just before start of the power generation operation of the fuel cell (claim 4).

In such a configuration, since the water in the first water storage portion is discarded through the discharge port just after stop of the power generation operation of the fuel cell and the water replenishment portion replenishes the water in the first water storage portion from the cooling water circulation portion just before start of the power generation operation of the fuel cell, decay of the water in the first water storage portion is able to be suppressed more effectively.

In the above case, the controller is configured to perform control such that the water in the first water storage portion is discarded through the discharge port and the water replenishment portion causes the cooling water circulation portion to replenish the water in the first water storage portion in a preset cycle, at a time in a power generation operation of the fuel cell (claim 5).

In accordance with such a configuration, since the water in the first water storage portion is discarded through the discharge port and the water replenishment portion causes the cooling water circulation portion to replenish the water in the first water storage portion in the preset cycle, at a time in the power generation operation of the fuel cell, the fuel cell system is able to continue the power generation operation for a long time period.

In the above case, the controller is configured to perform control such that the water replenishment portion causes the cooling water circulation portion to replenish, in the first water storage portion, water that has been heated to have a temperature of 60? or higher by cooling the fuel cell (claim 6).

In such a configuration, since the water replenishment portion causes the cooling water circulation portion to replenish, in the first water storage portion, the water heated to have a temperature of 60° C. or higher by cooling the fuel cell, sterilization or bacteria elimination of water is effectively carried out, thereby effectively suppressing decay of the water in the first water storage portion.)

In the above case, the controller is configured to perform control such that the water supply portion supplies water from the first water storage portion to the cooling water circulation portion by using the water that is discharged from at least one of the hydrogen generator and the fuel cell and is condensed by the water condenser (claim 7).

In such a configuration, since the water supply portion causes the first water storage portion to supply water to the cooling water circulation portion by using the water that is discharged from at least one of the hydrogen generator and the fuel cell and is condensed by the water condenser, the fuel cell system is able to configure water self-supply configuration.

In the above case, the fuel cell system may further comprise a second water storage portion configured to store a part of the water in the cooling water circulation portion; wherein the controller is configured to perform control such that a part of water in the cooling water circulation portion is stored in the second water storage portion at a time in a power generation operation of the fuel cell, and the water replenishment portion causes, instead of the cooling water circulation portion, the second water storage portion to replenish water in the first water storage portion (claim 8).

In such a configuration, since a part of water in the cooling water circulation portion is stored in the second water storage portion and the water replenishment portion causes the second water storage portion to replenish water in the first water storage portion, at a time in the power generation operation of the fuel cell, the water is able to be surely replenished in the first water storage portion.

In the above case, the fuel cell system may further comprise a cooler configured to cool the water replenished in the first water storage portion from the cooling water circulation portion; wherein the controller is configured to perform control such that the water replenishment portion causes the cooling water circulation portion to replenish, in the first water storage portion, the water cooled by the cooler (claim 9).

In such a configuration, since the water replenishment portion causes the cooling water circulation portion to replenish, in the first water storage portion, the water cooled by the cooler, thermal degradation of the ion exchange resin and so on with low heat resistance is able to be inhibited.

In the above case, the fuel cell system may further comprise a water temperature detector configured to detect a temperature of the water in the first water storage portion; wherein the controller is configured to set a cycle in which the water in the first water storage portion is discarded through the discharge port based on the temperature of the water in the first water storage portion that is detected by the water temperature detector (claim 10).

In such a configuration, since a cycle in which the water in the first water storage portion is discarded through the discharge port is set based on the temperature of the water in the first water storage portion that is detected by the water temperature detector, it is able to be suitably set depending on season and so on.

In the above case, the fuel cell system further comprise a water purifier configured to purify water supplied by the water supply portion from the first water storage portion to at least one of the hydrogen generator, the fuel cell, and the cooling water circulation portion (claim 11).

In such a configuration, since the water purifier purifies water supplied by the water supply portion from the first water storage portion to at least one of the hydrogen generator, the fuel cell, and the cooling water circulation portion, water free from impurities is able to be supplied.

In this case, the water purifier includes at least one of ion exchange resin and active carbon (claim 12).

In such a configuration, since the water purifier includes at least one of the ion exchange resin and the active carbon, the water is able to be suitably purified.

EFFECTS OF THE INVENTION

In accordance with the fuel cell system of the present invention, water that is more likely to decay is discarded from the water storage portion on a regular basis in such a manner that at least a part of water condensed in an interior of the fuel cell system and stored in the water storage portion is discarded at a time in a stop state of the power generation operation, or at least a part of water stored in the water storage portion is discarded at a time in the power generation operation, and at least a part of the water in the water storage portion is replaced by water that is less likely to decay by replenishing cooling water of the fuel cell that has been sterilized by utilizing a heat energy generated in the power generation operation of the fuel cell and is supplied by the water replenishment means from the cooling water circulation portion. Thereby, decay of circulated water is inhibited in the stop state of the power generation operation, and water that is less likely to decay is able to be circulated in the interior of the fuel cell system during the power generation operation.

Since the cooler is disposed in the water replenishment passage through which a part of the cooling water is supplied from the cooling water circulation portion to the water storage portion, the cooling water that has cooled the fuel cell and has thereby increased in temperature during the power generation operation can be cooled before being supplied to the water storage portion. Since the water cooled by the cooler is supplied to the water purifier when the fuel cell system performs the power generation operation continuously, thermal degradation of the ion exchange resin or the like of the water purifier can be suppressed. Furthermore, since the second water storage portion is provided to store a part of the cooling water of the cooling water circulation portion, and water is replenished in the water storage portion from the second water storage portion, the water is surely replenished in the water storage portion with the water level lowered after discarding the water at a time in the power generation operation. As a result, progress of decay of water in the fuel cell system is able to be surely suppressed.

Because of the above mentioned effects, it is possible to provide a fuel cell system that is capable of effectively suppressing progress of decay of water with a simple construction and without wasting energy so as not to substantially cause problems to occur in water supply and water purification functions.

EXPLANATION OF REFERENCE NUMERALS 1 hydrogen generator
2 material feed portion
3 water supply portion
3a water supply control portion
3b hydrogen generation water supply passage
3b cooling water replenishment passage
4a hydrogen supply passage
4b hydrogen off gas passage
5 fuel cell power generation portion
6 blower
7 cooling water circulation portion
8 water condenser
9 first water storage portion
9a water level sensor
9b water temperature detector
10 water replenishment portion
10a water replenishment passage
11 water purifier
11a active carbon
11b ion exchange resin
12 discharge port
13 city water supply valve
14 second water storage portion
15 cooler
100 to 300 fuel cell system
101 controller

BEST MODE FOR CARRYING OUT THE INVENTION

Hereinafter, best mode for carrying out the invention will be described with reference to the accompanying drawings.

Embodiment 1

First, a construction of a fuel cell system according to an embodiment 1 of the present invention will be described with reference to the drawings.

Figure 1:
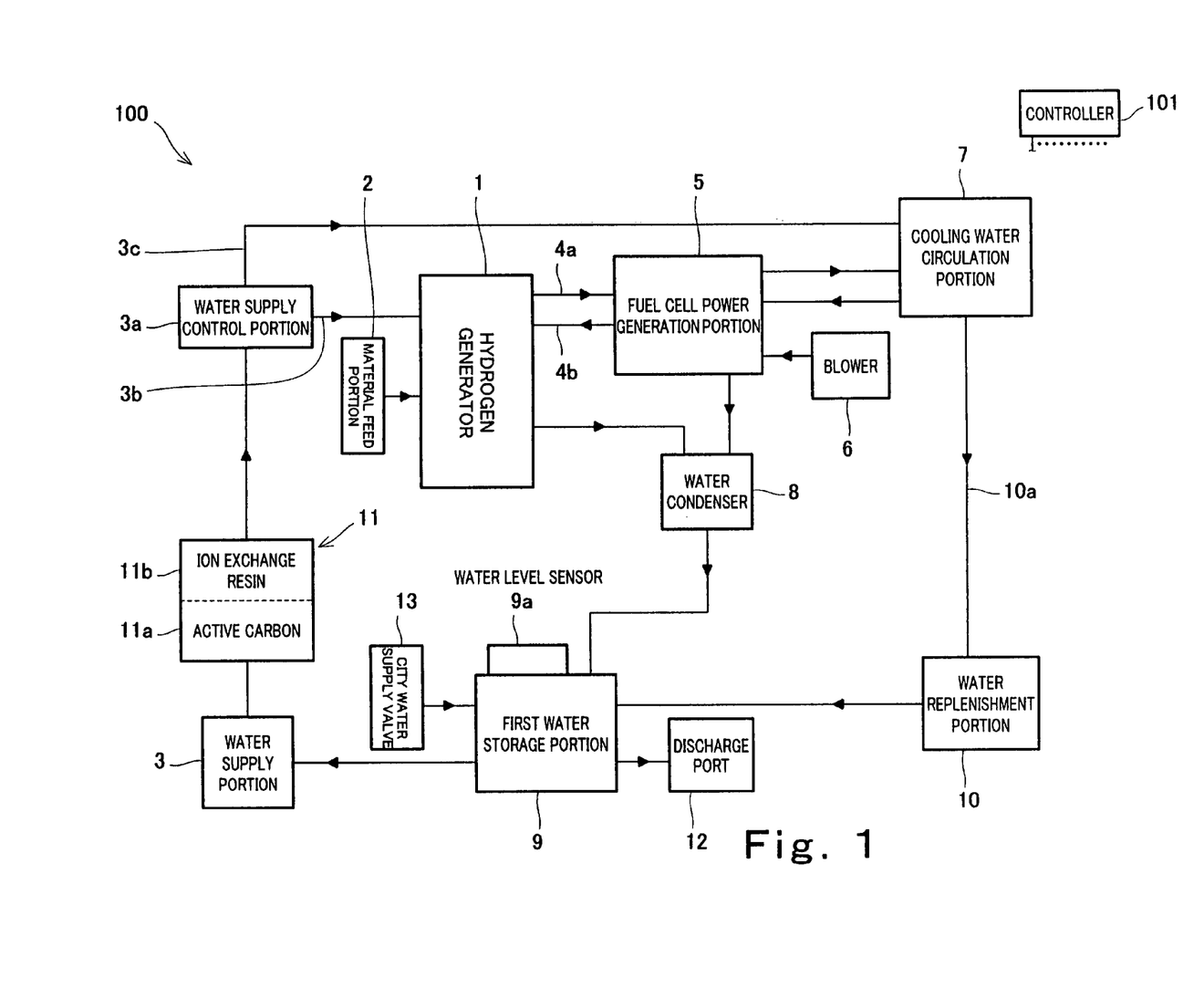
FIG. 1 is a block diagram schematically showing a construction of a fuel cell system according to an embodiment 1 of the present invention.

FIG. 1 is a block diagram schematically showing a construction of a fuel cell system according to an embodiment 1 of the present invention. In FIG. 1, solid lines between components of the fuel cell system indicate pipes, and arrows indicated on these solid lines indicate flow directions of water, a reformed gas, and so on, flowing in the pipes, in a normal state.

As shown in FIG. 1, a fuel cell system 100 of this embodiment includes a hydrogen generator 1. The hydrogen generator 1 is configured to cause a reforming reaction to mainly proceed using a material including an organic compound containing at least carbon and hydrogen, for example, a natural gas, a hydrocarbon component such as LPG, alcohol such as methanol, or a naphtha component, and steam to generate a hydrogen-rich reformed gas. The hydrogen generator 1 includes a reformer that causes the reforming reaction to proceed, and a carbon monoxide shift converter (hereinafter simply referred to as a shift converter) that reduces carbon monoxide in the reformed gas outflowing from the reformer, and a carbon monoxide removing portion (hereinafter referred to as a purifier), although these components are not specifically illustrated in FIG. 1. The reformer includes a reforming catalyst that promotes the reforming reaction, a flame burner that combusts a part of the material or an off gas (excess reformed gas or hydrogen off gas) returned from a reformed-gas supply destination (i.e., fuel cell) to supply heat required to promote the reforming reaction, and a sirocco fan for supplying combustion air. The shift converter is provided with a shift reaction catalyst that causes carbon monoxide in the reformed gas outflowing from the reformer and the steam to react with each other. The purifier is provided with a CO removing catalyst that conducts oxidation or methanation of carbon monoxide in the reformed gas outflowing from the shift converter. The shift converter and the purifier are respectively operated under temperature conditions suitable for respective chemical reactions in order to effectively reduce carbon monoxide contained in the reformed gas. The components other than the reformer, the shift converter, and the purifier in the interior of the hydrogen generator 1 will not be described herein.

As shown in FIG. 1, the fuel cell system 100 includes a material feed portion 2. The material feed portion 2 is configured to feed, to the hydrogen generator 1, a material such as a natural gas used to generate hydrogen. In this embodiment, the material feed portion 2 is configured to feed the natural gas as the material, from infrastructure of the natural gas. The material to generate hydrogen is not intended to be limited to the natural gas illustrated in this embodiment, but any other materials including the organic compound containing at least carbon and hydrogen, for example, the hydrocarbon component such as LPG, the alcohol such as methanol, or the naphtha component, may be used. For example, when the LPG is used as the material, the material feed portion 2 is equipped with a LPG tank.

The fuel cell system 100 includes a water supply portion 3. The water supply portion 3 is configured to supply, to the hydrogen generator 1 or a cooling water circulation portion 7 mentioned later, water to generate steam used in the reforming reaction or water to cool the fuel cell which is included in a power generation portion 5. In this embodiment, the water supply portion 3 is equipped with a plunger pump. The plunger pump is operated to cause the water to outflow to the hydrogen generator 1 and to the cooling water circulation portion 7. As shown in FIG. 1, the water outflowing from the water supply portion 3 is purified by the water purifier 11, and then flows through a water supply control portion 3a to be supplied to the hydrogen generator 1 and to the cooling water supply portion 7 through a hydrogen generation water supply passage 3b and a cooling water replenishment passage 3c, respectively. The water purifier 11 includes active carbon 11a and ion exchange resin 11b. Impurity removing materials used in the water purifier 11 are not limited to the active carbon 11a and the ion exchange resin 11b, but any other impurity removing materials such as zeolite, ceramic, etc, may be used provided that the materials are able to remove impurities such as ions or organic matters from the water.

The water supply control portion 3a includes, for example, a small water storage tank and a water supply pump. In this embodiment, since the water is distributed and supplied from the water supply portion 3 to the hydrogen generator 1 and the cooling water circulation portion 7, the small water storage tank is equipped with two water supply pumps. The water is supplied from the water supply portion 3 to the small water storage tank and operations of the respective water supply pumps are suitably controlled. Thereby, water is supplied from the water supply portion 3 to the hydrogen generator 1 and the cooling water circulation portion 7 suitably.

The fuel cell system 100 includes the fuel cell power generation portion 5 which is a base of its power generation portion. The fuel cell power generation portion 5 is configured to carry out power generation to output predetermined power using a hydrogen-rich reformed gas which outflows from the hydrogen generator 1 and is supplied to an anode side (fuel electrode side) of the fuel cell power generation portion 5 and air that is inhaled by a blower 6 and is supplied therefrom to a cathode side (air electrode side) of the fuel cell power generation portion 5. In this embodiment, the fuel cell power generation portion 5 includes a polymer electrolyte fuel cell. The fuel cell power generation portion 5 is configured such that the air supplied to the cathode side is humidified by moisture contained in the air exhausted after the air is consumed for the power generation in the interior of the fuel cell power generation portion 5. In the fuel cell power generation portion 5, if the air supplied to the cathode side is deficient in humidity, a part of the cooling water stored in the cooling water supply portion 7 is evaporated in the interior of the fuel cell power generation portion 5 to enable the air to have suitable humidity. As shown in FIG. 1, the reformed gas generated in the hydrogen generator 1 is supplied to the anode side of the fuel cell power generation portion 5 through a hydrogen supply passage 4a. An excess reformed gas which has not been consumed in the power generation and is exhausted from the fuel cell power generation portion 5 is returned to the hydrogen generator 1 through the hydrogen off gas passage 4b. The excess reformed gas returned to the hydrogen generator 1 through the hydrogen off gas passage 4b is supplied to the flame burner in the reformer and is combusted therein to enable the reforming reaction to proceed. Since an internal construction of the fuel cell power generation portion 5 is identical to that of a general fuel cell power generation portion, it will not be further described.

The fuel cell system 100 includes the blower 6. The blower 6 is configured to inhale atmospheric air and to supply the air to the cathode side of the fuel cell power generation portion 5. As the blower 6, a sirocco fan or the like is suitably used.

The fuel cell system 100 includes the cooling water circulation portion 7. The cooling water circulation portion 7 includes a small water storage tank that stores cooling water and a water supply pump that causes the cooling water to circulate. The cooling water circulation portion 7 causes the water supply pump to flow the cooling water in the water storage tank into a cooling water passage (not shown in FIG. 1) formed in the interior of the fuel cell power generation portion 5, in order to cool the fuel cell power generation portion 5 that generates heat during power generation. The cooling water circulation portion 7 circulates the cooling water to recover the heat generated in the fuel cell power generation portion 5 during the power generation, thus cooling the fuel cell power generation portion 5. The cooling water circulation portion 7 is configured to heat the water supplied from outside using the recovered heat, for purposes of hot-water supply, and so on. In this embodiment, as described above, the cooling water replenishment passage 3c extends from the water supply control portion 3a, separately from the hydrogen generation water supply passage 3b, to enable the cooling water to be replenished in the cooling water circulation portion 7 from the water supply portion 3 through the cooling water replenishment passage 3c.

The fuel cell system 100 includes the water condenser 8. The water condenser 8 is configured to condense moisture from the air exhausted from the cathode side of the fuel cell power generation portion 5 and the hydrogen generator 1, and an exhaust gas resulting from combustion in a reformer heater in the interior of the hydrogen generator 1. In this embodiment, the water condenser 8 includes a condenser. The condenser has a condenser mechanism using an air-cooling fan. The condenser mechanism condenses moisture from the exhausted air and the exhaust gas resulting from combustion. Since an internal structure of the water condenser 8 is identical to that of the water condenser generally used in the fuel cell system, it will not be further described in detail.

The fuel cell system 100 includes a first water storage portion 9. In an embodiment, a fuel cell system equipped with a second water storage portion in addition to the first water storage portion 9 will be described later. The water condensed by the water condenser 8 is supplied to the first water storage portion 9. The first water storage portion 9 stores the water supplied from the water condenser 8. To this end, the first water storage portion 9 is equipped with a water storage tank. As shown in FIG. 1, a water level sensor 9a of, for example, a float type, is attached on an upper region of the water storage tank, and is configured to detect an amount of stored water. Based on a signal output from the water level sensor 9a, the amount of water stored in the first water storage portion 9 is controlled. As shown in FIG. 1, the first water storage portion 9, the water condenser 8, and the water supply portion 3 are coupled through predetermined pipes. This enables the fuel cell system 100 to self-supply the water. With this self-supply configuration in the fuel cell system 100, the water stored in the first water storage portion 9 is taken out from the water supply portion 3, and is supplied to the respective components that consume the water. The components that consume the water includes a humidification means and so on (not shown in FIG. 1) that humidifies the reformed gas or air supplied to the fuel cell power generation portion 5, in addition to the hydrogen generator 1 and the cooling water circulation portion 7.

As shown in FIG. 1, the first water storage portion 9 is coupled to a city water supply valve 13 through a pipe. In this embodiment, the city water supply valve 13 is coupled to a water line through a pipe. As shown in FIG. 1, the first water storage portion 9 is coupled to a discharge port 12 through a pipe. The discharge port 12 is constructed of for example, an electromagnetic valve. The water stored in the first water storage portion 9 is discharged outside the fuel cell system 100 as necessary through the discharge port 12.

While the water level sensor 9a is attached only on the first water storage portion 9 in this embodiment, water level sensors may be attached on components such as the water supply control portion 3a and the cooling water circulation portion 7, which require control of a water amount, as necessary. The water level sensors attached on the water supply control portion 3a, the cooling water circulation portion 7, and so on, control water levels to enable control of the amount of water stored therein.

The fuel cell system 100 includes a controller 101 configured to correctly control operations of components of the fuel cell system 100. The controller 101 includes a storage portion, a central processing unit (CPU), and so on, which are not specifically illustrated in FIG. 1. Programs associated with operation of the respective components of the fuel cell system 100 are pre-stored in the storage portion of the controller 101. Based on the programs stored in the storage portion, the controller 101 correctly controls the operation of the fuel cell system 100.

As shown in FIG. 1, in the fuel cell system 100 of this embodiment, the first water storage portion 9 is coupled to the cooling water circulation portion 7 (specifically, a water storage tank that stores cooling water or a cooling water circulation passage) through a water replenishment passage 10a. A water replenishment portion 10 is disposed at a predetermined location of the water replenishment passage 10a. In this embodiment, the water replenishment portion 10 includes a water supply pump. The water replenishment portion 10 is configured to take out the cooling water from the cooling water circulation portion 7 through the water replenishment passage 10a and to supply the cooling water to the first water storage portion 9 through the water replenishment passage 10a. In the fuel cell system 100 of this embodiment, the water is replenished in the first water storage portion 9 from the cooling water circulation portion 7.

An operation of the fuel cell system of the embodiment 1 will be described with reference to the drawings.

The fuel cell system 100 operates as follows under control of the controller 101. As defined herein, a power generation operation of the fuel cell system 100 includes a start operation (start-up mode) of the power generation operation, a steady power generation operation (power generation mode) following the start operation, and a termination operation (stop mode), following the power generation operation. The start operation (start-up mode) of the power generation operation means an operation to stably start-up the fuel cell system 100 for the power generation operation. The termination operation of the power generation operation means an operation to stably stop the power generation operation of the fuel cell system 100.

The fuel cell system 100 includes a controller 101 configured to correctly control operations of components of the fuel cell system 100. The controller 101 includes a storage portion, a central processing unit (CPU), and so on, which are not specifically illustrated in FIG. 1. Programs associated with operation of the respective components of the fuel cell system 100 are pre-stored in the storage portion of the controller 101. Based on the programs stored in the storage portion, the controller 101 correctly controls the operation of the fuel cell system 100.

When the hydrogen-rich reformed gas is supplied from the hydrogen generator 1 to the anode side of the fuel cell of the fuel cell power generation portion 5, and the air is supplied from the blower 6 to the cathode side, in the fuel cell power generation portion 5, respectively, power generation is carried out to generate predetermined power, using the reformed gas and the air supplied to the anode side and the cathode side. An excess reformed gas which has not been consumed in the power generation is exhausted from the anode side of the fuel cell and is returned to the hydrogen generator 1. The excess reformed gas is supplied to the flame burner of the hydrogen generator 1. In the flame burner, the reformed gas is combusted to cause the reforming reaction to proceed. As described later, the air exhausted from the cathode side of the fuel cell is supplied to the water condenser 8 to condense the moisture.

During power generation, the fuel cell of the fuel cell power generation portion 5 generates heat through an electrochemical reaction for power generation. The heat generated in the fuel cell power generation portion 5 is recovered in such a manner that the cooling water in the interior of the water storage tank of the cooling water circulation portion 7 circulates through a cooling water pipe formed in the interior of the fuel cell power generation portion 5. The heat recovered by the cooling water circulation portion 7 is utilized for purposes of, for example, hot-water supply. In this embodiment, as described above, the cooling water replenishment passage 3c extends from the water supply control portion 3a to the cooling water circulation portion 7. Through the cooling water replenishment passage 3c, the cooling water is replenished in the cooling water circulation portion 7 from the water supply portion 3.

During the power generation, the air containing water generated by the power generation is exhausted from the fuel cell power generation portion 5. The exhaust gas resulting from combustion, containing moisture, is exhausted from the hydrogen generator 1. The exhaust air and the exhaust gas are supplied to the water condenser 8, which condenses the moisture. The water condenser 8 condenses water contained in the exhaust air and the exhaust gas. The condensed water is sent from the water condenser 8 to the first water storage portion 9.

The water is supplied from the first water storage portion 9 to the water purifier 11 by the operation of the water supply portion 3. The active carbon 11a and the ion exchange resin 11b of the water purifier 11 have a water purification function to remove the impurities from the water. The water from which the impurities have been removed, flows to the water supply control portion 3a, which controls a supply amount. The resulting water is supplied to the hydrogen generator 1 and the cooling water circulation portion 7. In the fuel cell system 100 of this embodiment, the water condensed by the water condenser 8 is stored in the first water storage portion 9. Thereby, the power generation operation is carried out continuously without replenishing the water consumed in the hydrogen generator 1 or the cooling water circulation portion 7, from outside in a normal condition. If the water level sensor 9*a* detects deficiency of water that occurred for some reasons in the fuel cell system 100, then the city water is taken in through the city water supply valve 13 or the water is discarded through the discharge port 12. In this manner, the water stored in the first water storage portion 9 is correctly controlled.

As described previously, a basic power generation operation of the fuel cell system 100 of this embodiment is similar to the power generation operation of the conventional fuel cell system. As in the conventional fuel cell system, in the fuel cell system 100 of this embodiment, the power generation operation is carried out in such a manner that the water is self-supplied by using the condensed water within the fuel cell system 100.

In the fuel cell system 100 in which the water is thus self-supplied, the condensed water obtained within the system 100 is substantially free from impurities such as calcium or metal ions. Therefore, the elements such as the active carbon 11*a* and the ion exchange resin 11*b* are expected to have relatively long lives. However, since the water condensed by the water condenser 8 does not contain a sterilization component such as chlorine, whereas the air exhausted from the cathode side contains bacteria and nutrients (organic matter) necessary for the bacteria, the condensed water is likely to decay later. If the decay of the condensed water progresses, passage clogging or passage narrowing occurs in the interior of the pipes associated with water condensation or water supply, causing problems to occur in water condensation or water supply. This makes it difficult to enable the fuel cell system 100 to carry out the power generation operation correctly. In order to inhibit progress of decay of the condensed water, there has been proposed that the bacteria or the like contained in the condensed water is killed by using ozone or an ultraviolet ray. But, such a method is unable to perfectly kill the bacteria or the like, and therefore the water still contains bacteria. In addition, the first water storage portion 9 that stores a large amount of water tends to be a place where the bacteria grow. Especially in a stop state of the power generation operation, the water is not substantially moving, and in many cases, the bacteria easily grow. In this case, a supply pressure loss or the like takes place in the water supply portion 3 that supplies water, because of passage clogging. As a result, a required amount of water is unable to be supplied to the hydrogen generator 1, the fuel cell power generation portion 5, and so on. This may be significantly problematic in a correct operation of the fuel cell system 100.

In this embodiment, in the stop state of the power generation operation of the fuel cell system 100, desirably just after the stop of the power generation operation, the electromagnetic valve or the like of the discharge port 12 is controlled by the controller 101 to open for a predetermined time period so that the water stored in the first water storage portion 9 (i.e., the water that contains the bacteria and the nutrients and is likely to decay) is discarded in a predetermined amount through the discharge port 12. Thereafter, desirably just before the start of the power generation operation, the controller 101 controls the water replenishment portion 10 to supply a part of the cooling water stored in the cooling water circulation portion 7 to the first water storage portion 9 through the water replenishment passage 10*a*, in order to replenish, in the first storage portion 9, the water equal in amount to the discarded water. Thus, in this embodiment, by discarding the water from the first water storage portion 9 and by replenishing the water in the first water storage portion 9 from the cooling water circulation portion 7, progress of decay of the water in the fuel cell system 100 is effectively suppressed in the fuel cell system 100 without wasting energy.

A suppressing function and effect of the bacteria in the fuel cell system 100 of this embodiment will be described below.

In the fuel cell system 100, the fuel cell generates heat energy substantially equal to the electric energy generated and is operated at a relatively high temperature. For example, during power generation, an operation temperature of the polymer electrolyte fuel cell of this embodiment, which is able to perform a power generation operation at relatively low temperatures, is approximately 70° C.

During the power generation operation of the fuel cell system 100, the heat energy generated in the fuel cell is removed and the temperature of the fuel cell is maintained by operating the cooling water circulation portion 7. In this case, the temperature of the cooling water circulated by the cooling water circulation portion 7 is always approximately 70° C. which is substantially equal to the operating temperature of the fuel cell.

Generally, it is possible to kill general bacteria or suppress growth of the bacteria by heating up to a temperature of 60° C. or higher. So, it may be assumed that the cooling water that has been circulated by the cooling water circulation portion 7 in the interior of the fuel cell power generation portion 5, and has increased in temperature up to approximately 70° C., is converted into water free from bacteria or water with growth of the bacteria suppressed, because the amount of bacteria is significantly reduced by the heating. That is, by utilizing the heat generated by power generation in the fuel cell power generation portion 5, it becomes possible to sterilize the cooling water circulated by the cooling water circulation portion 7 without wasting energy. On the other hand, the condensed water generated in the fuel cell system 100 and obtained by the water condenser 8 has no heating source to heat the condensed water, and its temperature does not increase up to 60° C. or higher. Therefore, the bacteria, for example, in the interior of the first water storage portion 9 is more likely to grow.

In this embodiment, as described above, after the water in which the bacteria is more likely to grow, i.e., the water in the interior of the first water storage portion 9 is discarded at a time in the stop state of the power generation operation, water equal in amount to the discarded water is replenished in the first water storage portion 9 from the interior of the cooling water circulation portion 7 in which the bacteria is less likely to grow, and thereafter, the power generation operation of the fuel cell system 100 starts. The reason why the water is discarded from the first water storage portion 9 in the stop state of the power generation operation of the fuel cell system 100 is that the stop state of the power generation operation is a timing at which deficiency of water supply does not arise a problem in operation, and progress of decay of water is effectively suppressed in the stop state of the power generation operation when the water is not moving. Thus, in the fuel cell system 100 of this embodiment, the cooling water in the cooling water circulation portion 7 in which the bacteria is killed or its growth is suppressed by utilizing the heat energy generated in the fuel cell power generation portion 5, is replenished in the first water storage portion 9 with the water level lowered because the water is discarded at a time in the stop state of the power generation operation, desirably, just before the start of the power generation operation. Since the bacteria contained in the water stored in the first water storage portion 9 can be reduced in the manner described above, progress of decay of the water in the fuel cell system 100 can be easily and effectively suppressed with a simple construction. In accordance with the present invention, it is possible to provide a highly reliable fuel cell system 100 in which problems are less likely to occur in water supply and water purification functions.

In accordance with this embodiment, since the cooling water in the cooling water circulation portion 7 is sterilized efficiently by utilizing the heat generated in the fuel cell power generation portion 5, the cooling water is able to be sterilized with a simple configuration efficiently without addition of components for heating and without wasting energy. In other words, the fuel cell system 100 is able to save energy.

In this embodiment, at a time in a start state of the power generation operation of the fuel cell system 100, the water replenishment portion 10 causes the cooling water circulation portion 7 to replenish the water in the first water storage portion 9. According to this configuration, in the start state of the power generation operation, since the water in the cooling water circulation portion 7 is often cooled to a relatively low temperature, and, a temperature increase in the water in the first water storage portion 9 is inhibited by replenishing the low-temperature water in the first water storage portion 9 from the cooling water circulation portion 7, thermal degradation of the active carbon 11a and the ion exchange resin 11b in the water purifier 11 can be inhibited. For example, if water with 70° C. is supplied to the water purifier 11, an ability of the active carbon 11a to adsorb an organic component degrades. In addition, in this case, because heat resistant temperature of the ion exchange resin 11b is exceeded, the ion exchange resin 11b is thermally degraded. However, in accordance with the configuration in which the cooling water circulation portion 7 replenishes the low-temperature water in the first water storage portion 9, problems such as degradation of the adsorbing ability of the active carbon 11a, thermal degradation of the ion exchange resin 11b, and so on can be avoided. In other words, the fuel cell system 100 enables the water purifier 11 to have relatively stable water purification ability.

The timing at which the water in the first water storage portion 9 is discarded is a time in the stop state of the power generation operation of the fuel cell system 100 in this embodiment, but is not intended to be limited to this. Also, it is not necessary to discard the water in the first water storage portion 9 at a time in each stop state of the power generation operation. The water in the first water storage portion 9 may be discarded at any timing at which the power generation operation of the fuel cell system 100 is not interfered. How decay of the water progresses changes depending on water temperature. For example, in winter season when water temperature is low, a growing speed of bacteria in water is slow. Also, when the power generation operation is stopped in a relatively short time after the start of the power generation operation of the fuel cell system 100, the bacteria is less likely to grow. For these reasons, it is not necessary to discard the water in the first water storage portion 9 at a time in each stop state of the power generation operation, but the timing at which the water is discarded may be set depending on an operation state of the fuel cell system 100. In order to prevent the bacteria from growing, water other than the water in the cooling water circulation portion 7 is desirably discarded.

The timing at which the water replenishment portion 10 replenishes the water in first water storage portion 9 after the water in the first water storage portion 9 is discarded through the discharge port 12 may be just after the stop of the power generation operation of the fuel cell system 100 so long as the water is discarded at a time in the stop state, but desirably just before the start of the power generation operation of the fuel cell system 100. This is because, decay of water is more likely to progress during a stop period of the power generation operation if the water replenishment portion 10 replenishes the water in the first water storage portion 9, just after the stop of the power generation operation. With the configuration in which the water replenishment portion 10 replenishes the water in the first water storage portion 9 just before the start of the power generation operation of the fuel cell system 100, unwanted decay of the water can be inhibited.

The timing at which the water replenishment portion 10 replenishes the water in the first water storage portion 9 is a time in the power generation operation if the water is discarded at a time in the power generation operation. This is because, if the power generation operation is carried out under the condition in which the water stored in the first water storage portion 9 is insufficient, the water supplied from the first water storage portion 9 to the hydrogen generator 1 becomes insufficient, causing the fuel cell power generation portion 5 to unstably operate. By discarding and replenishing the water at a time in the power generation operation of the fuel cell system 100, unstable power generation operation of the fuel cell power generation portion 5 can be avoided.

In general fuel cell systems including the fuel cell system 100 of this embodiment, water is generated in the interior by the power generation. The water is generated in such a manner that the reformed gas is generated using the fuel such as the natural gas and water through a reforming reaction, and hydrogen contained in the reformed gas is oxidized by oxygen in air to be converted into water in the fuel cell power generation portion 5. For example, when a fuel cell system with power generation efficiency of about 30% is used and methane is used as a material, about 400 g of water is generated per hour in power generation amount of 1 kW. Therefore, if the water is discarded at a time in the stop state of the power generation operation, and the cooling water circulation portion 7 replenishes a part of the water in the first water storage portion 9 at a time in the start-up state of the power generation operation, water deficiency does not take place in the fuel cell system 100, because water is generated by the power generation operation. In this embodiment, as shown in FIG. 1, the cooling water circulation portion 7 is coupled to the water supply portion 3 through the cooling water replenishment passage 3c through which the water is replenished suitably. Thereby, the fuel cell system 100 is able to continue stable power generation operation without introducing the city water from the water line into the first water storage portion 9 through the city water supply valve 13.

While in this embodiment, the polymer electrolyte fuel cell is equipped in the fuel cell power generation portion 5, it is exemplary. Any configuration may be used so long as a fuel cell that generates heat at a temperature of 60° C. or higher during a power generation operation is equipped in the fuel cell power generation portion 5. With such a configuration, the effects of this embodiment are able to be achieved. Exemplary fuel cells, other than the polymer electrolyte fuel cell, are a phosphoric-acid fuel cell operable at a temperature of about 200° C. during power generation or an alkaline fuel cell operable at a temperature of 60° C. to 80° C.

Embodiment 2

Figure 2:
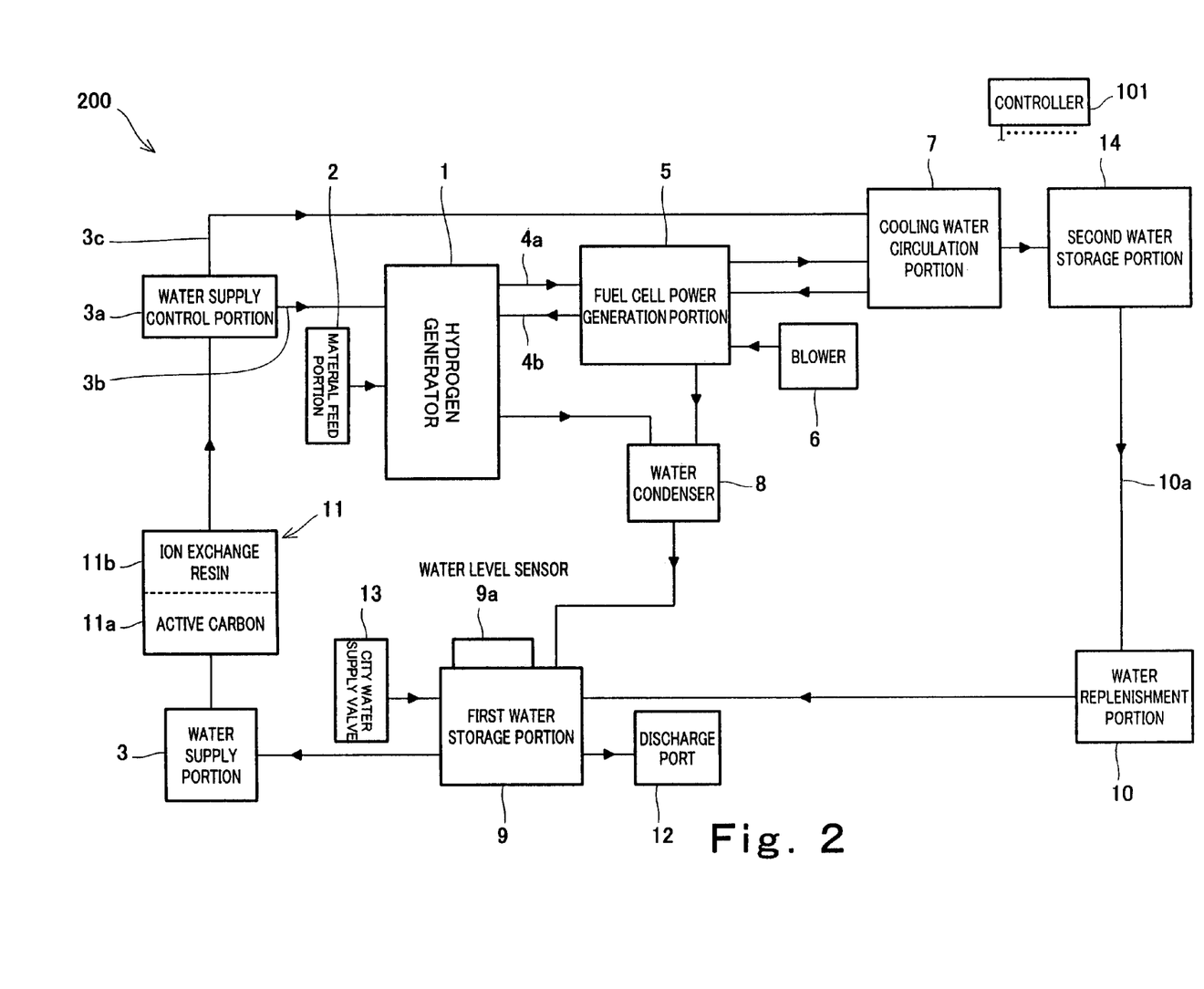
FIG. 2 is a block diagram schematically showing a construction of a fuel cell system according to an embodiment 2 of the present invention.

FIG. 2 is a block diagram schematically showing a construction of a fuel cell system according to an embodiment 2 of the present invention. In FIG. 2, solid lines extending between the components in the fuel cell system indicate pipes, and arrows on the solid lines indicate flow directions of water, a reformed gas, and so on, flowing in the pipes. In FIG. 2, the same components as those of the fuel cell system 100 of the embodiment 1 are identified by the same reference numerals.

As shown in FIG. 2, a fuel cell system 200 of this embodiment includes components substantially identical to those of the fuel cell system 100 of the embodiment 1. The construction of the fuel cell system 200 of this embodiment is identical to the construction of the fuel cell system 100 of this embodiment 1 except that a second water storage portion 14 is disposed at a location of the water replenishment passage 10a coupling the cooling water circulation portion 7 to the water replenishment portion 10.

As described above, in the fuel cell system 200 of this embodiment, the second water storage portion 14 is disposed at a location of the water replenishment passage 10a coupling the cooling water circulation portion 7 to the water replenishment portion 10. The second water storage portion 14 stores a part of the cooling water circulated by the cooling water circulation portion 7 during the power generation operation of the fuel cell system 200. In other words, the second water storage portion 14 functions as a water storage tank for storing the cooling water of the cooling water circulation portion 7.

In this embodiment, during the power generation operation of the fuel cell system 200, a part of the cooling water in the cooling water circulation portion 7 is stored in the water storage tank of the second water storage portion 14. At a time in the stop state of the power generation operation of the fuel cell system 200, the water stored in the first water storage portion 9 is discarded in a predetermined amount through the discharge port 12. At a time in the start-up state of the power generation operation of the fuel cell system 200, the water replenishment portion 10 causes the water stored in the second water storage portion 14 to be supplied to the first water storage portion 9 through the water replenishment passage 10a to enable water equal in amount to the discarded water to be replenished in the first water storage portion 9. Or, a part of the water in the first water storage portion 9 is discarded in each preset period during the power generation operation of the fuel cell system 200, and the water replenishment portion 10 causes the second water storage portion 14 to replenish the water in the first water storage portion 9. Thus, in this embodiment, the water in the first water-storage portion 9 is discarded and the water is replenished in the first water storage portion 9 from the second water storage portion 14, thereby surely and effectively inhibiting progress of decay of the water without wasting energy in the fuel cell system 200.

In accordance with the fuel cell system 200 of this embodiment, the second water storage portion 14 is able to store a part of the cooling water circulated by the cooling water circulation portion 7. Thus, the water of the cooling water circulation portion 7 which is replenished in the first water storage portion 9 is surely obtained. Since the water is not directly replenished in the first water storage portion 9 from the cooling water circulation portion 7, the water replenished in the first water storage portion 9 is made to have a relatively low temperature. Since time to cool the water to be replenished in the first water storage portion 9 becomes unnecessary, a part of the water in the first water storage portion 9 is suitably discarded, and the water is suitably replenished in the first water storage portion 9 from the second water storage portion 14 without stopping the power generation operation of the fuel cell system 200. In accordance with this embodiment, the effects similar to those of the embodiment 1 are obtained when the fuel cell system 200 carries out the power generation operation continuously.

The fuel cell system 200 of this embodiment achieves the above mentioned effects with a simple configuration and by saving energy. In this embodiment, the amount and cycle of the water discarded from the first water storage portion 9 and the amount and cycle of the water replenished in the first water storage portion 9 from the second water storage portion 14 may be suitably set based on evaluation results of sampled bacteria or the like from water and according to a state of the power generation operation of the fuel cell system 200, and so on. The size of the second water storage portion 14 (amount of maximum water stored) may be determined in view of the amount of water required at a time in the start-up state of the power generation operation. The amount of water replenished in the second water storage portion 14 from the cooling water circulation portion 7 may be suitably set so as not to cause a problem to occur in the power generation operation of the fuel cell system 200 and so as not to cause deficiency of recovered heat. In an initial state of replenishment, the water in the second water storage portion 14 contains bacteria equal in number to those of the water in the cooling water circulation portion 7. If the water in the second water storage portion 14 is left unused for a long time period, the number of general bacteria tends to increase. So, it is desirable to discard the water in the second water storage portion 14 on a regular basis or to supply the water from the second water storage portion 14 to the first water storage portion 9 on a regular basis. The other respects are identical to those of the embodiment 1.

Embodiment 3

Figure 3:
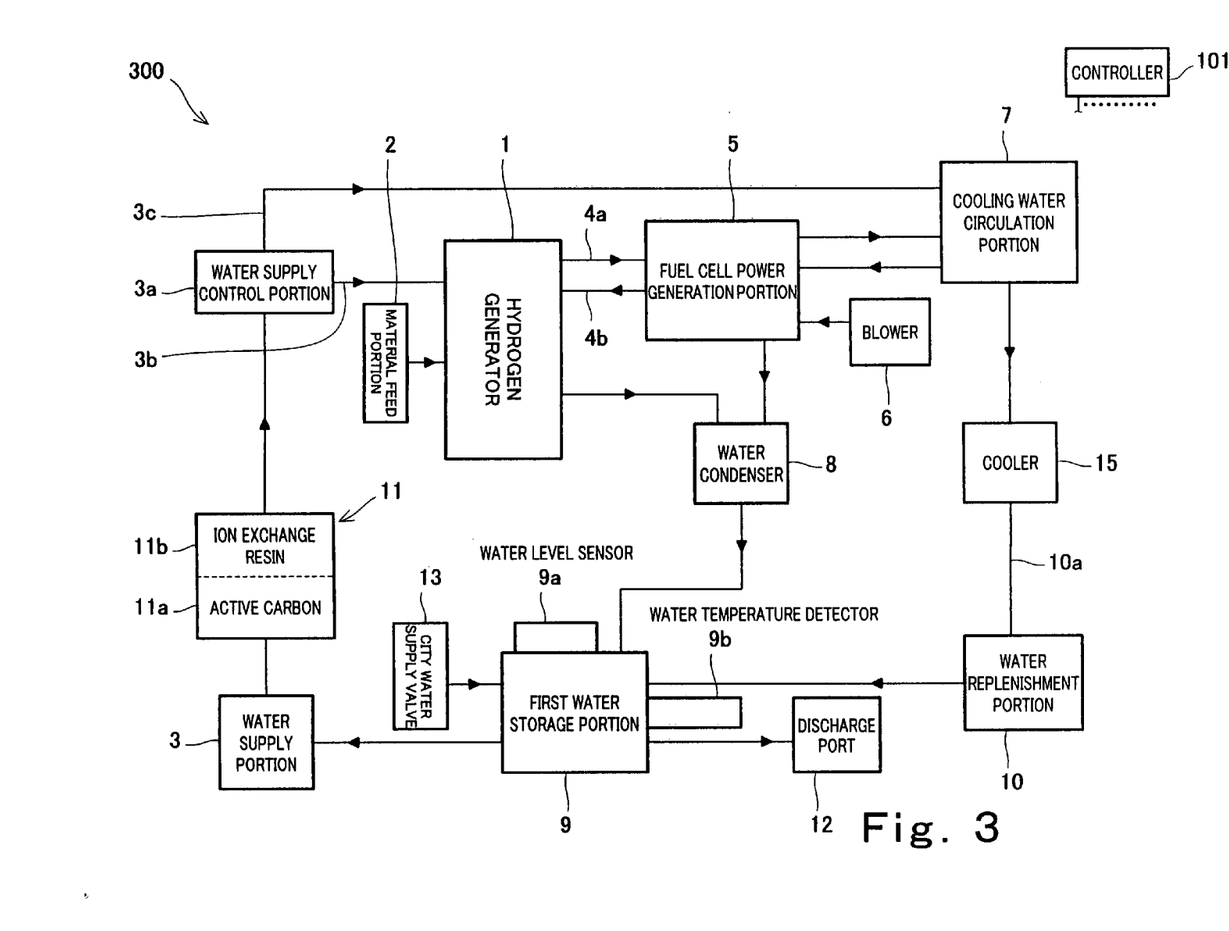
FIG. 3 is a block diagram schematically showing a construction of a fuel cell system according to an embodiment 3 of the present invention.

FIG. 3 is a block diagram schematically showing a construction of a fuel cell system according to an embodiment 3 of the present invention. In FIG. 3, solid lines extending between the components in the fuel cell system indicate pipes, and arrows on the solid lines indicate flow directions of water, a reformed gas, and so on, flowing in the pipes. In FIG. 3, the same components as those of the fuel cell system 100 of the embodiment 1 are identified by the same reference numerals.

As shown in FIG. 3, a fuel cell system 300 of this embodiment includes components substantially identical to those of the fuel cell system 100 of the embodiment 1. The construction of the fuel cell system 300 of this embodiment is identical to that of the fuel cell system 100 of the embodiment 1 except that a cooler 15 is disposed at a location of the water replenishment passage 10a coupling the cooling water circulation portion 7 to the water replenishment portion 10, and a water temperature detector 9b is attached on the first water storage portion 9.

As described above, in the fuel cell system 300 of this embodiment, the cooler 15 is disposed at a location of the water replenishment passage 10a coupling the cooling water circulation portion 7 to the water replenishment portion 10. The cooler 15 is equipped with a fan for cooling the water by air-cooling. The cooler 15 cools a part of water of the cooling water circulation portion 7 by air-cooling during the power generation operation of the fuel cell system 300, and supplies the cooled water to the water replenishment portion 10. While in this embodiment, the cooler 15 is equipped with the fan for air-cooling the water, this configuration is exemplary. For example, the cooler 15 may alternatively be equipped with a heat exchanger that uses heat energy of temperature-increased water for hot water-supply in order to cool the water.

As described above, in the fuel cell system 300 of this embodiment, the water temperature detector 9b is attached on the first water storage portion 9. The water temperature detector 9b detects a temperature of water stored in the first water storage portion 9. The water temperature detector 9b includes, for example, a thermistor, which is disposed in the interior of the first water storage portion 9 and is configured to detect the temperature of the water stored in the first water storage portion 9. A change in an electric resistance of the thermistor is analyzed by the controller 101. The controller 101 recognizes the temperature of the water stored in the first water storage portion 9.

In this embodiment, during the power generation operation of the fuel cell system 300, a part of the water in the first water storage portion 9 is discarded and then the water replenishment portion 10 causes the cooling water circulation portion 7 to replenish the water in the first water storage portion 9. The water to be replenished in the first water storage portion 9 from the cooling water circulation portion 7 is cooled by the cooler 15. The water replenishment portion 10 replenishes the cooled water in the first water storage portion 9. When the water is replenished in the first water storage portion 9, the water temperature detector 9b detects a temperature of the water in the first water storage portion 9. The controller 101 correctly controls a cooling operation of the cooler 15 so that temperature of the water detected by the water temperature detector 9b is within a predetermined temperature range. The predetermined temperature range is determined considering, for example, heat-resistant temperatures of the active carbon 11a and the ion exchange resin 11b of the water purifier 11. In this embodiment, the predetermined temperature range is set based on 50° C. which is the heat-resistant temperature of the ion exchange resin 11b. Thus, in this embodiment, when the water is replenished in the first water storage portion 9 from the cooling water circulation portion 7, the cooler 15 cools the water while the water temperature detector 9b monitors the temperature of the water stored in the first water storage portion 9 so that the temperature becomes within the predetermined temperature range. In this manner, in the fuel cell system 300, progress of decay of water is effectively suppressed without wasting energy and without thermally degrading the ion exchange resin 11b of the water purifier 11.

In accordance with the fuel cell system 300 of this embodiment, the cooler 15 is disposed between the cooling water circulation portion 7 and the first water storage portion 9, and the water cooled by the cooler 15 irrespective of an operation state is replenished in the first water storage portion 9, growth of bacteria is able to be surely suppressed in various operation states. In addition, since the water temperature detector 9b detects the temperature of the water stored in the first water storage portion 9 to always monitor the temperature of the water cooled by the cooler 15, the cooler 15 is operated correctly, and thus, a temperature load on the water purifier 11 can be reduced.

In accordance with the fuel cell system 300 of this embodiment, the cycle in which the water in the first water storage portion 9 is discarded is determined based on the water temperature detected by the water temperature detector 9b. In general, how decay of the water progresses changes depending on the season. For example, in summer season when the water temperature is relatively high, decay of water tends to progress fast, while in winter season when the water temperature is relatively low, decay of water tends to progress slowly. By detecting the temperature of the water stored in the first water storage portion 9 by the water temperature detector 9b, the cycle in which the water in the first water storage portion 9 is discarded is made shorter when the water temperature is high, and is made longer when the water temperature is low. When the water temperature is low and therefore decay of water progresses slowly, the cycle in which the water in the first water storage portion 9 is discarded is made shorter to minimize the amount of the water discarded from the first water storage portion 9, thereby suppressing energy consumption to discard the water. By optimizing the timing at which the water in the first water storage portion 9 is discarded, the fuel cell system 300 is able to consume less energy. The cycle in which the water is discarded is allowed to be determined for each fuel cell system based on the monitored water temperature in the first water storage portion 9 after the stop of the power generation operation when the water temperature is stable. The other respects are identical to those of the embodiment 1.

Example 1

Using the fuel cell system 100 of the embodiment 1 of the present invention, a research relating to how decay of water progresses and prevention effect was conducted.

In an example 1, the fuel cell system 100 of FIG. 1 was caused to perform the power generation operation continuously for one week, one month, and two months, without discarding and replenishing the water. Then, the water in the first water storage portion 9 was sampled for each time period, and the number of general bacteria contained in each sampled water was measured by an agar medium method. As a result, the number of general bacteria in a case where the fuel cell system 100 was caused to perform the power generation operation continuously for one week was about 100/ml. The number of general bacteria in a case where the fuel cell system 100 was caused to perform the power generation operation continuously for one month was about 2000/ml. The number of general bacteria in a case where the fuel cell system 100 was caused to perform the power generation operation continuously for two months was about 9000/ml. In the case where the fuel cell system 100 was caused to perform the power generation operation continuously for two months, slippage occurred in an inner surface of the water storage tank of the first water storage portion 9, and growth of the bacteria was obviously observed, which did not cause problems to occur in water supply and purification functions.

Next, an operation pattern was carried out, in which the fuel cell system 100 of FIG. 1 was caused to carry out the power generation operation continuously for one week, and then to stop for five hours, the water stored in the first water storage portion 9 was discarded at a time in the stop hours, and the cooling water in the cooling water circulation portion 7 was replenished in the first water storage portion 9 at a time in the start-up state of the fuel cell system 100. The operation pattern was carried out for one month and for two months. Thereafter, the water in the first water storage portion 9 was sampled before being discarded, and the number of general bacteria contained in each sampled water was measured by the agar medium method. As a result, the number of general bacteria contained in each sampled water was each about 300/ml. In this case, the water in the cooling water circulation portion 7 was sampled for each power generation operation performed continuously for one week as described above, and the number of general bacteria contained in each sampled water was measured by the agar medium method. As a result, the number of general bacteria contained in each water sampled from the cooling water circulation portion 7 was each about 10/ml. From these results, it has been revealed that the bacteria does not substantially grow, because the bacteria in the water of the cooling water circulation portion 7 is killed by the heat generated in the fuel cell power generation portion 5.

From the result mentioned above, it has been revealed that, as described in the embodiment 1, growth of the bacteria is effectively inhibited in such a manner that the cooling water in the cooling water circulation portion 7 that is sterilized by using the heat energy generated in the fuel cell power generation portion 5 so that the bacteria are killed or their growth is suppressed, is replenished in the first water storage portion 9 with the water level lowered because the water is discarded at a time in the stop state of the power generation operation, desirably just before the start of the power generation operation.

As a matter of course, the above mentioned growth state of bacteria changes depending on the installation place, season, initial state, use temperature, and so on of the fuel cell system 100.

Example 2

Using the fuel cell system 100 of the embodiment 1 of the present invention, a first research relating to the timing at which water in the first water storage portion 9 is discarded and the amount of discarded water, and the timing at which the water is replenished in the first water storage portion 9 from the cooling water circulation portion 7 and the amount of replenished water was conducted.

In an example 2, the fuel cell system 100 was caused to perform the power generation operation continuously with power generation of 1 kW, about 400 g of water in the first water storage portion 9 was discarded every one hour in the power generation operation, and the water equal in amount to the discarded water was replenished in the first water storage portion 9 from the cooling water circulation portion 7. In the example 2, the maximum amount of water stored in the first water storage portion 9 was 4 L. At the start of the power generation operation, the amount of water stored in the first water storage portion 9 was set to 3.6 L, and at that point of time, the water was sampled. Thereafter, about 400 g of water in the first water storage portion 9 was discarded every one hour in the power generation operation, water equal in amount to the discarded water was replenished in the first water storage portion 9 from the cooling water circulation portion 7, and then the water in the first water storage portion 9 was sampled. Then, the number of general bacteria contained in the sampled water was measured by the agar medium method. The research of the example 2 was carried out on a fine day in summer season.

Figure 4A:
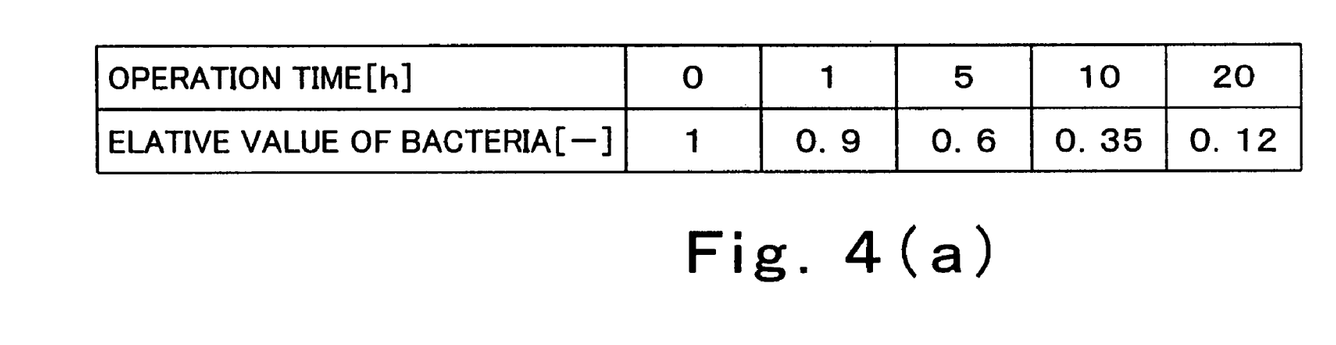
FIG. 4(a) is a view showing a relationship between elapsed time of a power generation operation and a relative change in the number of general bacteria.

FIG. 4(a) is a view showing a relationship between elapsed time of a power generation operation and a relative change in the number of general bacteria. In FIG. 4(a), the number of general bacteria corresponding to an operation time of 0 h is assumed to be 1 and the number of general bacteria thereafter is indicated as a relative value.

It has been revealed that, as shown in FIG. 4(a), the relative value of the number of general bacteria decreases with an increase in the operation time of the power generation operation, by discarding about 400 g of water in the first water storage portion 9 every one hour in the power generation operation, and by replenishing water equal in amount to the discarded water, in the first water storage portion 9 from the cooling water circulation portion 7. That is, by discarding the water in the first water storage portion 9 according to the timing and amount of the water discarded from the first water storage portion 9 illustrated in the example 2, and thereafter replenishing the water in the first water storage portion 9 from the cooling water circulation portion 7, the number of general bacteria contained in the water in the first water storage portion 9 can be reduced.

While the water is discarded and replenished with amount of 400 g and every one hour, the number of general bacteria contained in the water in the first water storage portion 9 changes depending on the amount and frequency. Therefore, it is desirable to well consider the amount of discarded water and timing at which the water is discarded, and the amount of replenished water and the timing at which the water is replenished, assuming the operation state or environmental temperature of the installation place of the fuel cell system 100, in order to set optimal ones.

While in the example 2, the amount of discarded water and the timing at which the water is discarded are set to cause the number of general bacteria contained in the water of the first water storage portion 9 to decrease with time, it does not necessarily decrease with time. For example, the number of general bacteria contained in the water in the first water storage portion 9 is allowed to be controlled so as not to cause at least clogging in filters formed of the active carbon 11a or the ion exchange resin 11b illustrated in FIG. 1. Furthermore, the amount of discarded water and frequency of discarding the water, and the amount of water replenished in the first water storage portion 9 from the cooling water circulation portion 7 and frequency of replenishing the water are allowed to be suitably set so that the number of general bacteria contained in the water of the first water storage portion 9 is maintained at a safe level.

Example 3

Using the fuel cell system 100 of the embodiment 1 of the present invention, a second research relating to the timing at which water in the first water storage portion 9 is discarded and the amount of discarded water, and the timing at which water is replenished in the first water storage portion 9 from the cooling water circulation portion 7 and the amount of replenished water was conducted.

In an example 3, the fuel cell system 100 was caused to perform the power generation operation continuously with power generation of 1 kW continuously for 10 hours per day, about 2000 g of water in the first water storage portion 9 was discarded every day in the power generation operation, and the water equal in amount to the water discarded on a previous day was replenished in the first water storage portion 9 from the cooling water circulation portion 7. In the example 3, as in the example 2, the maximum amount of water stored in the first water storage portion 9 was 4 L. Before the start of the power generation operation, the water in the first water storage portion 9 was first sampled. Thereafter, about 2000 g of water in the first water storage portion 9 was discarded after the end of the power generation operation every day, and in the following day, the water equal in amount to the discarded water was replenished in the first water storage portion 9 from the cooling water circulation portion 7 before the start of the power generation operation. After the replenishment, the water in the first water storage portion 9 was sampled. The number of general bacteria contained in the sampled water was measured by the agar medium method. The research of the example 3 was conducted on a fine day in summer season as in the example 2.

Figure 4B:
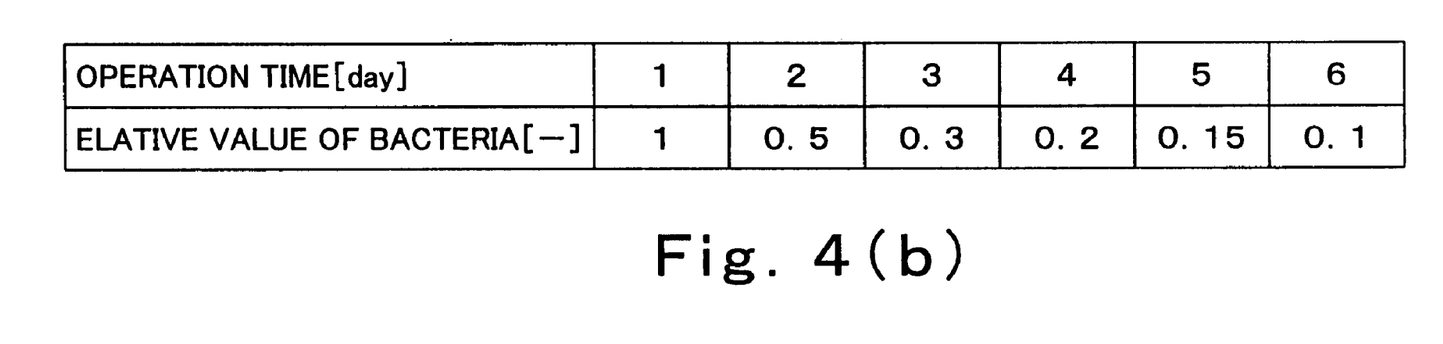
FIG. 4(b) is a view showing a relationship between elapsed days of a power generation operation and a relative change in the number of general bacteria.

FIG. 4(b) is a view showing a relationship between elapsed time of a power generation operation and a relative change in the number of general bacteria. In FIG. 4(b), the number of general bacteria corresponding to an operation day of 0 day is assumed to be 1 and the number of general bacteria thereafter is indicated as a relative value.

In the example 3, also, it has been revealed that, as shown in FIG. 4(b), the relative value of the number of general bacteria decreases with an increase in operation days of the power generation operation, by discarding about 2000 g of water in the first water storage portion 9 every day in the power generation operation, and replenishing the water equal in amount to the discarded water in the first water storage portion 9 from the cooling water circulation portion 7. That is, by discarding the water in the first water storage portion 9 according to the timing and amount illustrated in the example 3 and by thereafter replenishing the water in the first water storage portion 9 from the cooling water circulation portion 7, the number of general bacteria contained in the water in the first water storage portion 9 can be reduced.

While the water is discarded and replenished with amount of 2000 g and every day, the number of general bacteria contained in the water in the first water storage portion 9 changes depending on the amount and frequency. Therefore, as in the example 2, it is desirable to well consider the amount of discarded water and timing at which the water is discarded, and the amount of replenished water and the timing at which the water is replenished, assuming the operation state or environmental temperature of the installation place the fuel cell system 100, in order to set optimal ones.

While in the example 3, the amount of discarded water and the timing at which the water is discarded are set to cause the number of general bacteria contained in the first water storage portion 9 to decrease with time, it does not necessarily decrease with time, as in the example 2. For example, as described above, the amount of water discarded from the first water storage portion 9 and frequency of discarding the water, and the amount of water replenished in the first water storage portion 9 from the cooling water circulation portion 7 are allowed to suitably be set so as not to cause at least clogging in the filters formed of the active carbon 11a or the ion exchange resin 11b illustrated in FIG. 1.

Example 4

Using the fuel cell system 200 of the second embodiment of the present invention, a research relating to how decay of water progresses and prevention effect was conducted.

In an example 4, an operation pattern in which using the fuel cell system 200 of FIG. 2, water that is about half as much as water in the first water storage portion 9 was discarded once per day, and water equal in amount to the discarded water was replenished in the first water storage portion 9 from the second water storage portion 14, was carried out. The operation pattern was carried out for one week, for one month, and for two months. Thereafter, the water in the first water storage portion 9 was sampled before being discarded, and the number of general bacteria contained in each sampled water was measured by the agar medium method. As a result, the number of general bacteria in a case where the fuel cell system 200 was caused to perform the power generation operation continuously for one week was about 100/ml. The number of general bacteria in a case where the fuel cell system 200 was caused to perform the power generation operation continuously for one month was about 400/ml. The number of general bacteria in a case where the fuel cell system 200 was caused to perform the power generation operation continuously for two months was about 500/ml.

From the above mentioned results, it has been revealed that progress of decay of water in the first water storage portion 9 is able to be effectively suppressed by replacing, on a regular basis, a part of the water in the first water storage portion 9 with water containing less bacteria in the cooling water circulation portion 7.

INDUSTRIAL APPLICABILITY

A fuel cell system of the present invention is utilized in industrial applications as a fuel cell system that is capable of effectively suppressing progress of decay of water with a simple configuration and without wasting energy so as not to substantially cause problems to occur in water supply and purification functions.

The invention claimed is:

1. A fuel cell system comprising:
a hydrogen generator configured to generate hydrogen by causing a reforming reaction to proceed using a material and water;
a fuel cell configured to generate power by causing an electrochemical reaction to proceed using the hydrogen generated in said hydrogen generator and an oxidizing agent;
a cooling water circulation portion configured to circulate water for cooling said fuel cell;
a water condenser configured to condense water discharged from at least one of said hydrogen generator and said fuel cell;
a water storage portion configured to store the water condensed by said water condenser;
a water supply portion configured to take out the water from said water storage portion and to supply the water to at least one of said hydrogen generator, said fuel cell, and said cooling water circulation portion;
a controller; and
a water replenishment portion configured to replenish the water in said water storage portion from said cooling water circulation portion; wherein:
said water storage portion is provided with a discharge port; and
said controller is configured to perform control so that at least a part of the water in said water storage portion is discarded through the discharge port, and said water replenishment portion causes said cooling water circulation portion to replenish, in said water storage portion, water equal in amount to the at least a part of the water.

2. A fuel cell system comprising:
a hydrogen generator configured to generate hydrogen by causing a reforming reaction to proceed using a material and water;
a fuel cell configured to generate power by causing an electrochemical reaction to proceed using the hydrogen generated in said hydrogen generator and an oxidizing agent;
a cooling water circulation portion configured to circulate water for cooling said fuel cell;
a water condenser configured to condense water discharged from at least one of said hydrogen generator and said fuel cell;
a water storage portion configured to store the water condensed by said water condenser;
a water supply portion configured to take out the water from said water storage portion and to supply the water to at least one of said hydrogen generator, said fuel cell, and said cooling water circulation portion;

a controller; and a water replenishment portion configured to replenish the water in said water storage portion from said cooling water circulation portion; wherein:

said water storage portion is provided with a discharge port; and said controller is configured to perform control such that the water in said water storage portion is discarded through the discharge port, and said water replenishment portion causes said cooling water circulation portion to replenish the water in said water storage portion, at a time in a stop state of a power generation operation of said fuel cell.

3. The fuel cell system according to claim 2, wherein said controller is configured to perform control such that the water in said water storage portion is discarded through the discharge port just after stop of the power generation operation of said fuel cell and said water replenishment portion causes said cooling water circulation portion to replenish the water in said water storage portion, just before start of the power generation operation of said fuel cell.

4. A fuel cell system comprising:

a hydrogen generator configured to generate hydrogen by causing a reforming reaction to proceed using a material and water;

a fuel cell configured to generate power by causing an electrochemical reaction to proceed using the hydrogen generated in said hydrogen generator and an oxidizing agent;

a cooling water circulation portion configured to circulate water for cooling said fuel cell;

a water condenser configured to condense water discharged from at least one of said hydrogen generator and said fuel cell;

a water storage portion configured to store the water condensed by said water condenser;

a water supply portion configured to take out the water from said water storage portion and to supply the water to at least one of said hydrogen generator, said fuel cell, and said cooling water circulation portion;

a controller; and a water replenishment portion configured to replenish the water in said water storage portion from said cooling water circulation portion; wherein:

said water storage portion is provided with a discharge port; and said controller is configured to perform control such that the water in said water storage portion is discarded through the discharge port and said water replenishment portion causes said cooling water circulation portion to replenish water in said water storage portion in a preset cycle, at a time in a power generation operation of the fuel cell.

5. A fuel cell system comprising:

a hydrogen generator configured to generate hydrogen by causing a reforming reaction to proceed using a material and water;

a fuel cell configured to generate power by causing an electrochemical reaction to proceed using the hydrogen generated in said hydrogen generator and an oxidizing agent;

a cooling water circulation portion configured to circulate water for cooling said fuel cell;

a water condenser configured to condense water discharged from at least one of said hydrogen generator and said fuel cell;

a water storage portion configured to store the water condensed by said water condenser;

a water supply portion configured to take out the water from said water storage portion and to supply the water to at least one of said hydrogen generator, said fuel cell, and said cooling water circulation portion;

a controller; and a water replenishment portion configured to replenish the water in said water storage portion from said cooling water circulation portion; wherein:

said water storage portion is provided with a discharge port;

said controller is configured to perform control so that the water in said water storage portion is discarded through the discharge port; and said controller is configured to perform control such that said water replenishment portion causes said cooling water circulation portion to replenish, in said water storage portion, water that has been heated to have a temperature of 60° C. or higher by cooling said fuel cell.

6. A fuel cell system comprising:

a hydrogen generator configured to generate hydrogen by causing a reforming reaction to proceed using a material and water;

a fuel cell configured to generate power by causing an electrochemical reaction to proceed using the hydrogen generated in said hydrogen generator and an oxidizing agent;

a cooling water circulation portion configured to circulate water for cooling said fuel cell;

a water condenser configured to condense water discharged from at least one of said hydrogen generator and said fuel cell;

a first water storage portion configured to store the water condensed by said water condenser;

a water supply portion configured to take out the water from said first water storage portion and to supply the water to at least one of said hydrogen generator, said fuel cell, and said cooling water circulation portion;

a controller;

a water replenishment portion configured to replenish the water in said first water storage portion from said cooling water circulation portion; and a second water storage portion configured to store a part of the water in said cooling water circulation portion; wherein:

said first water storage portion is provided with a discharge port;

said controller is configured to perform control so that the water in said first water storage portion is discarded through the discharge port; and said controller is configured to perform control such that a part of water in said cooling water circulation portion is stored in said second water storage portion at a time in a power generation operation of said fuel cell, and said water replenishment portion causes said second water storage portion to replenish water in the first water storage portion.

7. A fuel cell system comprising:

a hydrogen generator configured to generate hydrogen by causing a reforming reaction to proceed using a material and water;

a fuel cell configured to generate power by causing an electrochemical reaction to proceed using the hydrogen generated in said hydrogen generator and an oxidizing agent;

a cooling water circulation portion configured to circulate water for cooling said fuel cell;

a water condenser configured to condense water discharged from at least one of said hydrogen generator and said fuel cell;

a water storage portion configured to store the water condensed by said water condenser;

a water supply portion configured to take out the water from said water storage portion and to supply the water to at least one of said hydrogen generator, said fuel cell, and said cooling water circulation portion;

a controller;

a water replenishment portion configured to replenish the water in said water storage portion from said cooling water circulation portion; and a cooler configured to cool the water replenished in said water storage portion from said cooling water circulation portion; wherein:

said water storage portion is provided with a discharge port;

said controller is configured to perform control so that the water in said water storage portion is discarded through the discharge port; and said controller is configured to perform control such that said water replenishment portion causes the cooling water circulation portion to replenish, in said water storage portion, the water cooled by the cooler.

8. A fuel cell system comprising:

a hydrogen generator configured to generate hydrogen by causing a reforming reaction to proceed using a material and water;

a fuel cell configured to generate power by causing an electrochemical reaction to proceed using the hydrogen generated in said hydrogen generator and an oxidizing agent;

a cooling water circulation portion configured to circulate water for cooling said fuel cell;

a water condenser configured to condense water discharged from at least one of said hydrogen generator and said fuel cell;

a water storage portion configured to store the water condensed by said water condenser;

a water supply portion configured to take out the water from said water storage portion and to supply the water to at least one of said hydrogen generator, said fuel cell, and said cooling water circulation portion;

a controller;

a water replenishment portion configured to replenish the water in said water storage portion from said cooling water circulation portion; and a water temperature detector configured to detect a temperature of the water in said water storage portion; wherein:

said water storage portion is provided with a discharge port;

said controller is configured to perform control so that said water replenishment portion causes said cooling water circulation portion to replenish the water in the water storage portion; and the controller is configured to set a cycle in which the water in said water storage portion is discarded through the discharge port based on the temperature of the water in said water storage portion that is detected by said water temperature detector.

* * * * *